United States Patent [19]

Bettini

[11] Patent Number: 5,092,550
[45] Date of Patent: Mar. 3, 1992

[54] LEVELING APPARATUS
[75] Inventor: John E. Bettini, Elgin, Ill.
[73] Assignee: MacLean-Fogg Company, Mundelein, Ill.
[21] Appl. No.: 76,730
[22] Filed: Jul. 23, 1987
[51] Int. Cl.⁵ .............................................. F11M 13/00
[52] U.S. Cl. .................... 248/188.4; 411/182; 411/301; 411/903
[58] Field of Search ............... 248/188.4, 188.8, 354.3, 248/650; 312/255, 256; 411/182, 301, 302, 303, 304, 902, 903

[56] References Cited

U.S. PATENT DOCUMENTS

| | | | |
|---|---|---|---|
| 2,320,031 | 5/1943 | Dansforth | 411/302 X |
| 2,969,831 | 1/1961 | Eames | 411/902 X |
| 3,131,505 | 5/1964 | Cruikshank | 248/188.4 |
| 3,289,724 | 12/1966 | Ernest | 411/303 |
| 3,868,079 | 2/1975 | Johnson | 248/188.4 |
| 4,325,526 | 4/1982 | Kitagawa | 248/73 |
| 4,460,298 | 7/1984 | Solarz et al. | 411/182 X |
| 4,490,083 | 12/1984 | Rebish | 411/902 X |
| 4,657,458 | 4/1987 | Woller et al. | 411/182 |

FOREIGN PATENT DOCUMENTS 1000677 11/1976 Canada ................................. 248/73
566232 12/1944 United Kingdom ................ 411/302

Primary Examiner—David L. Talbott
Attorney, Agent, or Firm—Mason, Kolehmainen, Rathburn & Wyss

[57] ABSTRACT

A leveler for adjustably selecting and thereafter maintaining a selected spacing interval between two parts comprises a base adapted to be fixedly mounted on a first part and including a threaded element therein. An elongated threaded support post is mounted in adjustable threaded engagement with the base and is selectively adjustable to extend outwardly thereof. A bumper formed of resilient material is secured to an outer end of the support post and includes a bearing surface for supporting engagement with a second part to be spaced from the first part. The base includes a lock for frictionally engaging the threaded support post for preventing unwanted rotation once the desired spacing interval is manually selected.

10 Claims, 3 Drawing Sheets

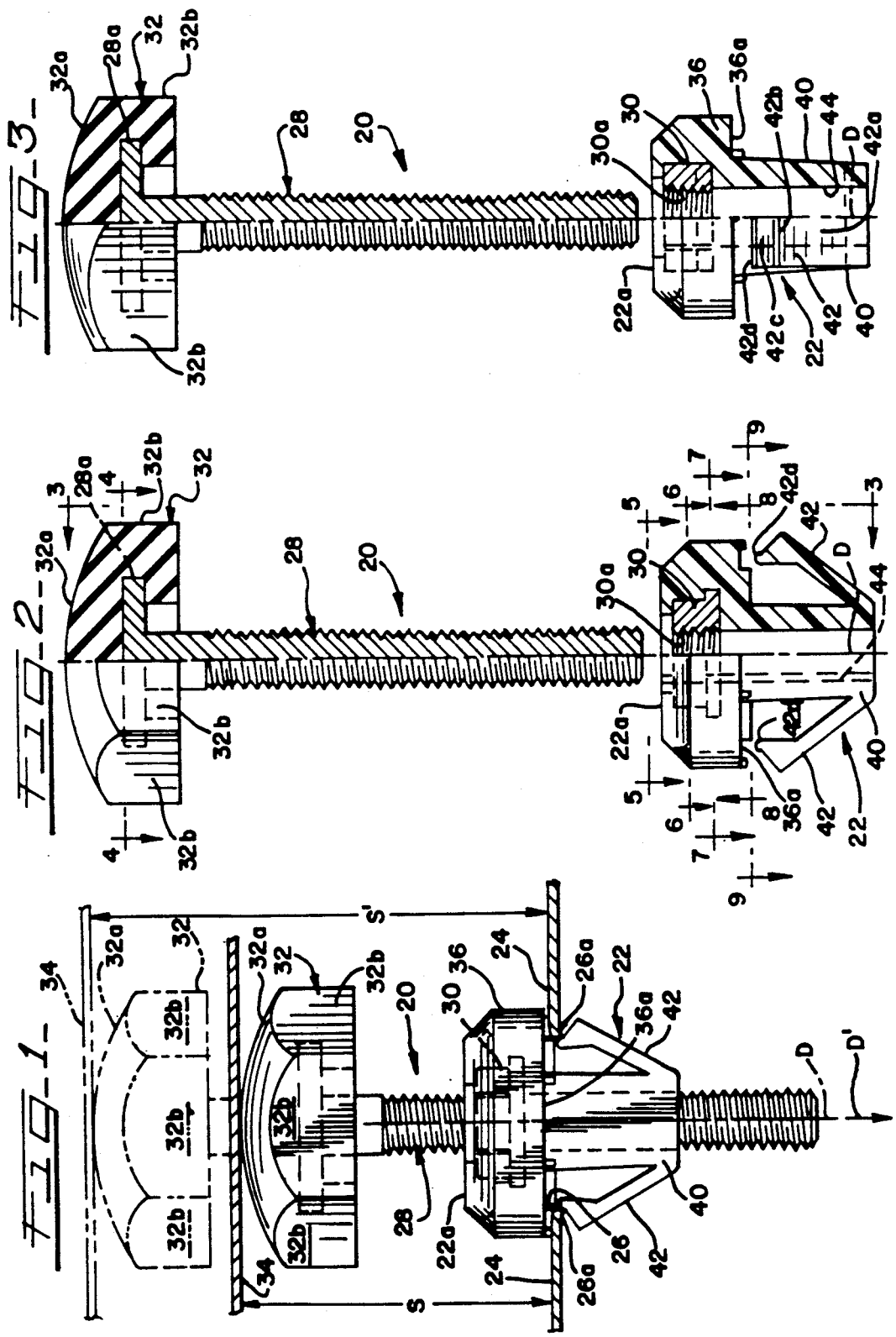

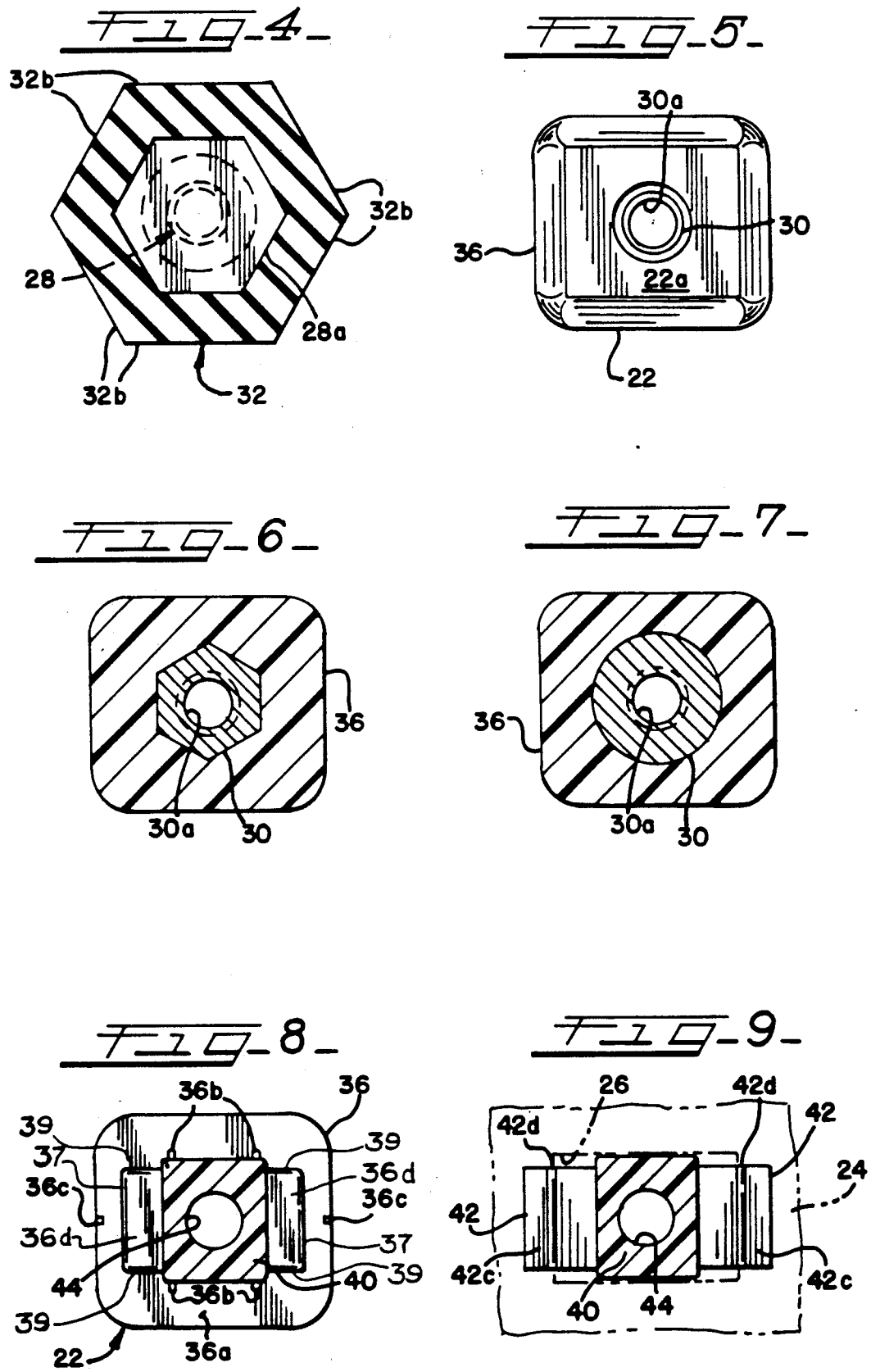

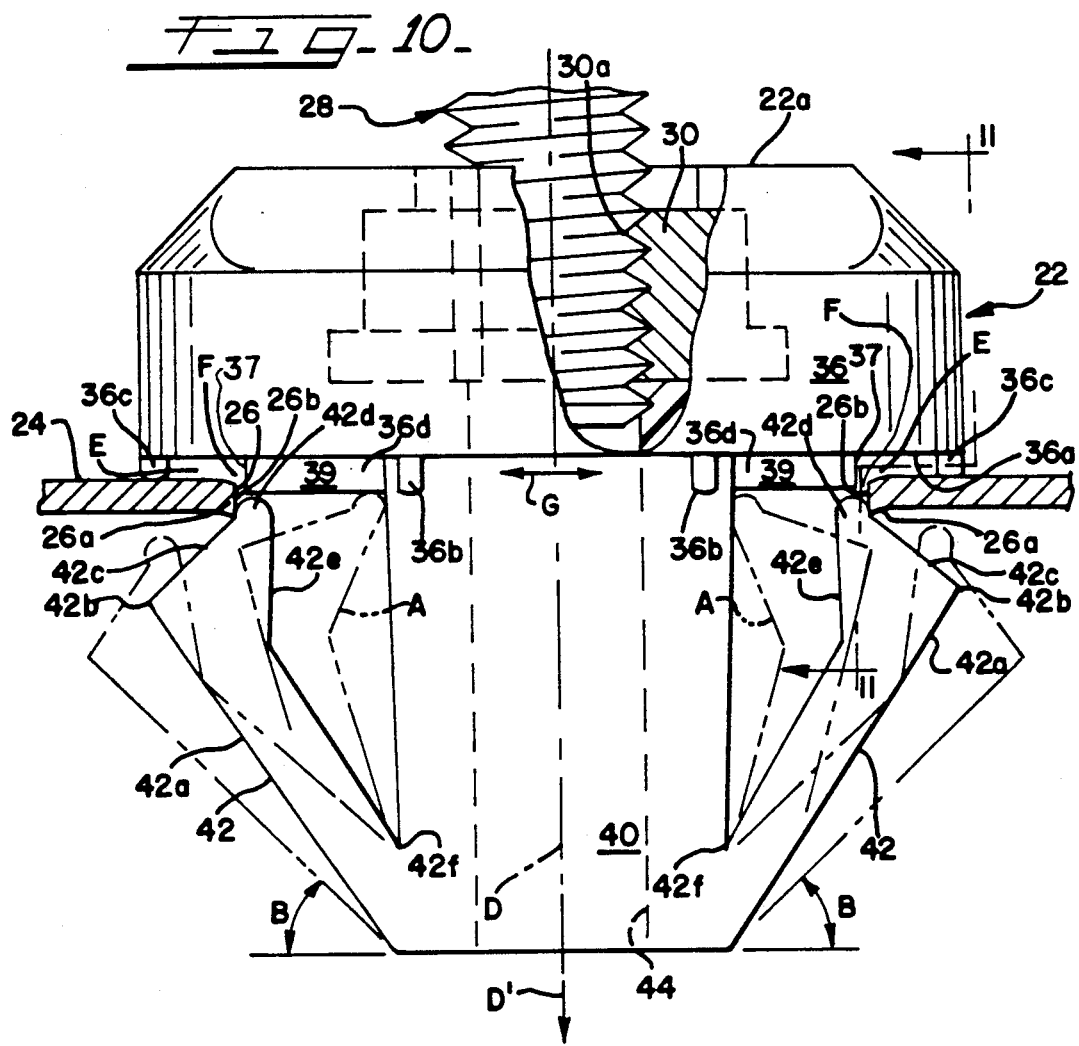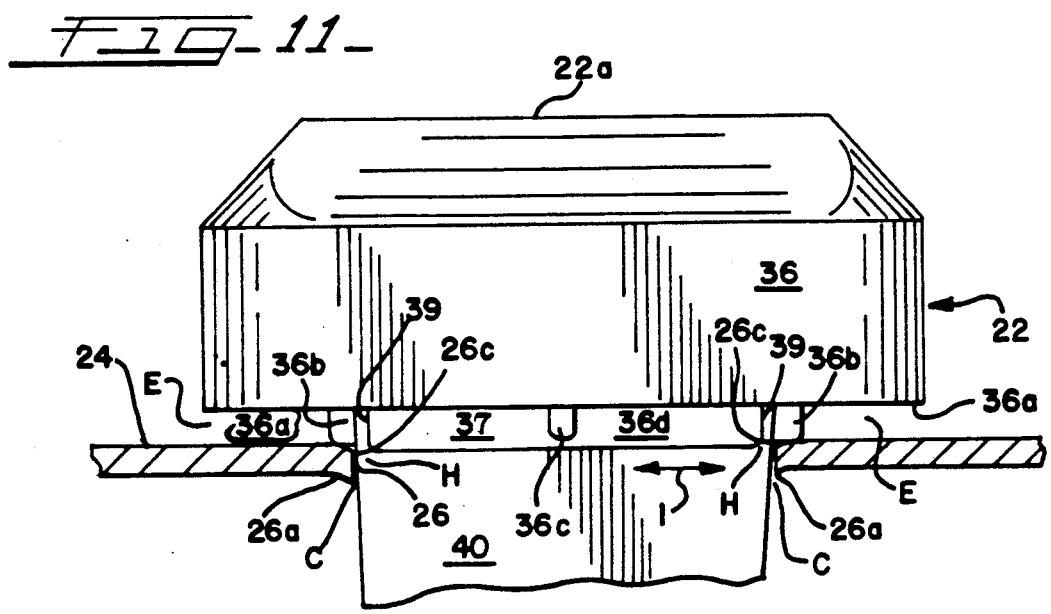

LEVELING APPARATUS

BACKGROUND OF THE INVENTION

1. Field of the Invention

The present invention relates to a new and improved leveling apparatus for adjustably selecting and thereafter maintaining a selected spacing interval between a pair of members such as a hood and body of a motor vehicle. Leveler apparatus in accordance with the invention is commonly termed as a "hood leveler" and is especially designed for mounting on a surrounding edge portion of a motor vehicle engine or trunk compartment and is adjustable upwardly thereof to maintain a selected spacing interval between a trunk or a hood member for closing the trunk or engine compartment.

2. Background of the Prior Art

In the past, hood levelers for automobile trunk and hood compartments have been relatively complex assemblies which were costly, difficult to install and which sometimes were subject to vibration which changed the desired spacing between the hood and the adjacent edge portion that the hood leveler was supposed to maintain. Moreover, many prior art devices were susceptible to corrosion and breakage, and in addition, did not lend themselves readily to mass production assembly in an automobile assembly line environment.

OBJECTS OF THE PRESENT INVENTION

It is therefore an object of the present invention to provide a new and improved leveling apparatus for adjustably selecting and thereafter maintaining a selected spacing interval between a pair of members such as a hood or trunk lid and an adjacent edge portion of an automobile body around the trunk or engine compartment.

It is another object of the present invention to provide a new and improved hood leveler for motor vehicles and the like which is readily adapted for assembly in an automobile mass production assembly line environment.

Another object of the present invention is to provide a new and improved leveling apparatus of the character described which is selectively adjustable to achieve a desired spacing interval between two parts or members.

Another object of the present invention is to provide an adjustable spacer of the character described which is hand-adjustable and which retains the selected adjustment in spite of continuing vibration and stress applied to surrounding and supporting elements in the immediate vicinity.

Yet another object of the present invention is to provide a new and improved hood leveler of the character described which is rapid and easy to install and which is designed to be staked in place in an opening provided in an adjacent base part or member.

Another object of the present invention is to provide a new and improved hood leveler of the character described having a base formed of relatively rigid, molded, resinous, plastic material which is strong, resilient and capable of withstanding temperatures up to 400° F.

It is another object of the present invention to provide a new and improved hood leveler of the character described wherein the base element is provided with a depending tongue for insertion into an opening and one or more resilient fingers attached to the tongue for centering and retaining the base in place once inserted.

Yet another object of the present invention is to provide a new and improved hood leveler of the character described having a mounting flange for covering the periphery of an opening in which a tongue is inserted and providing for a small amount of clearance between the flange and the metal forming the opening so that paint, rustproofing and other corrosion inhibiting processes may be applied to the metal after the hood leveler has been staked in place.

Still another object of the present invention is to provide a new and improved hood leveler of the character described which permits manual adjustment of the spacing interval yet retains the adjustment once selected even though the environment is subject to continuing vibration and stress.

Still another object of the present invention is to provide a new and improved hood leveler of the character described which includes a bumper formed of elastomeric, rubber-like material having a surface adapted to resilient engage one of the elements or members spaced away from the other.

Still another object of the present invention is to provide a new and improved hood leveler of the character described wherein the elastomeric bumper is bonded onto an outer end of a threaded support post and is bonded thereto so as to provide a minimum resistance to relative torque so that the bumper itself can be used as a hand grip for manually adjusting the spacing interval.

Still another object of the present invention is to provide a new and improved hood leveler of the character described which is staked in place in an opening and yet is removable therefrom when specifically required.

It is another object of the present invention to provide a new and improved self-contained hood leveler of the character described which is low in cost and pleasing in appearance and does not require a wrench or other tool for changing the spacing interval after the leveler is staked in place.

BRIEF SUMMARY OF THE INVENTION

The foregoing and other objects and advantages of the present invention are accomplished in a new and improved leveling apparatus of the character described and more particularly a hood leveler especially designed for adjustably selecting and thereafter maintaining a selected spacing interval between a pair of members such as a hood and surrounding engine compartment flange of a motor vehicle or the like. The hood leveler includes a base formed of molded resinous plastic material adapted to be fixedly mounted on an edge portion of an automobile hood or trunk compartment in a staking operation. The base includes an internally threaded element embodied therein and an elongated threaded support post is threadedly engaged with the embedded element and extends outwardly thereof. A bumper of resilient material is molded into place on an outer, or head end portion of the support post for engagement against a hood or trunk lid. Manually applied torque on the bumper is effective to adjust the spacing interval between the hood or trunk lid which is engaged against the bumper and the opposing facing edge portion of a trunk or engine compartment on which the base of the leveler is mounted.

The base is formed of molded plastic and is provided with a thread locking system in the form of an interfering bore extending in coaxial alignment with the bore of the embedded threaded element. When the support post is turned in the threaded element, the threads on the post displace portions of the interfering bore wall material of the base. This displacement is effective to frictionally engage the threads of the support post with enough binding force to prevent inadvertent, unwanted rotation of the post out of adjustment once selected yet permits hand rotation of the bumper to turn the support post relative to the base when selecting a desired spacing interval to be thereafter maintained.

The base is provided with a peripheral mounting flange and a depending tongue adapted to extend into an opening in the member on which the leveler is mounted in a staking operation. The tongue is provided with one or more resilient, integrally formed fingers which are deflectable inwardly to pass through the opening and then spring back outwardly to engage a side edge of the opening for centering the base therein and securing the base in position on the edge portion of the trunk or engine compartment.

BRIEF DESCRIPTION OF THE DRAWINGS

For a better understanding of the present invention, reference should be had to the following detailed description taken in conjunction with the drawings, in FIG. 1 is a side elevational view of a new and improved hood leveler constructed in accordance with the features of the present invention and illustrated in position for adjustably selecting and thereafter maintaining a selected spacing interval between a pair of members;

FIG. 2 is an exploded side elevational view of the leveler apparatus of FIG. 1; with portions shown in section FIG. 3 is a side elevational view with portions in section and taken substantially at right angles to the view of FIG. 2 along the lines 3—3 of FIG. 2;

FIG. 4 is a transverse cross-sectional view taken substantially along lines 4—4 of FIG. 2;

FIG. 5 is a transverse cross-sectional view taken lines 5—5 of FIG. 2;

FIG. 6 is a transverse cross-sectional view taken long lines 6—6 of FIG. 2;

FIG. 7 is a transverse cross-sectional view taken substantially of FIG. 2;

FIG. 8 is a transverse cross-sectional view taken along lines 8—8 of FIG. 2;

FIG. 9 is a transverse cross-sectional view taken lines 9—9 of FIG. 2;

FIG. 10 is a greatly enlarged, fragmentary elevational view the hood leveler of FIG. 1 shown as mounted in an opening formed in the edge of a trunk compartment; and FIG. 11 is a transverse side elevational view taken substantially along lines 11—11 of FIG. 10.

DETAILED DESCRIPTION OF A PREFERRED EMBODIMENT

Referring now more particularly to the drawings, therein is illustrated a new and improved hood leveler especially constructed and designed for adjustably selecting and thereafter maintaining a given spacing interval between a pair of parts or members such as a hood or trunk lid and an opposed surrounding edge portion of a hood or trunk compartment. The hood leveler is referred to generally in the drawings by reference numeral 20 and includes a molded plastic base 22 adapted to be staked onto a first part such as a panel 24 having a polygonal shaped opening or aperture 26 of generally rectangular shape formed therein as commonly provided in a surrounding edge portion of an engine or trunk compartment of a motor vehicle or the like. Normally the panel 24 is made of sheet metal such as steel or aluminum and the opening 26 is formed in a die-punching operation resulting in a small curf or downturned edge portion 26a on the underside of the panel around the peripheral edge of the opening.

The base 22 supports an externally threaded, elongated support post 28 mounted in adjustable threaded engagement with a metal nut 30 embedded in the base and having a polygonal shaped body. The nut has a threaded bore 30a with an axis D thereof extending normal to an upper surface 22a of the base. The nut and threaded support post are made of metal such as SAE 1015 steel that is surface treated to resist corrosion.

The threaded support post 28 includes an integrally formed polygonal shaped head 28a at the upper end and a resilient bumper 32 formed of rubberlike resilient material is molded in place on the hexagonally shaped head. The bumper 32 is made of a rubber-like material such as SAE J200 M3AA607B13CPZ1Z2 black EPDM elastomer. The bumper is molded in place around the polygonal shaped head 28a on the support post 28 and a good bond between the surfaces of the head and the bumper is established so that a minimum of 40 inch pounds of torque can be transmitted between the bumper and the post when the bumper is manually turned to raise or lower the level of the bumper above the base.

The bumper body is conveniently utilized as an enlarged handle or gripping element for manually turning the support post 28 in the embedded nut 30 in base 22. To facilitate manual turning of the bumper 32, the bumper itself is formed with flatted sides 32b in a polygonal-shaped arrangement such as the hexagonal shape as shown, or a square or rectangular outline, if desired. The bumper 32 includes a convex, spherically-shaped upper contact surface 32a adapted to bear against the underside of a second part or member 34 which may comprise a lower face of an edge portion of a hood or trunk lid.

The base 22 includes a generally rectangular-shaped upper head portion 36 of substantial thickness having a width and length greater than the respective width and length of the rectangular opening 26 in the panel. The head portion has rounded corners and chamfered upper edges providing a neat appearance (FIGS. 5 and 11) above the level of the panel 24 on which the leveler 20 is mounted.

The head 36 provides a continuous peripheral flange around the opening 26 and has a planar lower surface 36a confronting and facing a peripheral upper edge surface of the panel 24 around the edges of the polygonal-shaped opening as best shown in FIGS. 1, 10 and 11. A small clearance space E is established between the flange surface 36a and the upper surface of the panel 24 by means of a plurality of integrally formed spacers 36b and 36c extending downwardly from the planar surface 36a. The clearance space E provided between the undersurface 36a of the head flange and the upper surface of the panel 24 permits the upper surface panel to be painted and/or treated for corrosion prevention below the flange even after the base 22 of the hood leveler 20 has been staked in place in the panel opening 26.

The base 22 also includes an integrally formed, tongue portion 40 depending downwardly from the underside 36a of the head 36 and projecting through the rectangular opening 26 below the underside of the panel 24. The tongue has a polygonal-shaped transverse cross-section generally matching that of the opening 26 to prevent rotation of the base on the panel after the hood leveler 20 is staked into place. As viewed in FIG. 10, the tongue 40 has a width adjacent the upper end that is substantially less than a major axis width of the opening 26 in order that a pair of resilient, integrally formed fingers 42 can pass through the opening when the upper end portion of the fingers are deflected inwardly toward opposite sides of the tongue body as shown by the dotted or phantom line position labeled A.

As viewed in FIG. 11, the tongue 40 has a width at the upper end that is only slightly less than a minor axis width of the opening 26 in a transverse direction to the major width so as to provide only a small amount of clearance C between opposite faces of the tongue and the adjacent edges of the panel opening. The small amount of clearance C minimizes the amount of relative movement of the tongue and base on the panel 24 in a transverse direction once the base is staked in place. The transverse dimension of the tongue decreases slightly toward the lower end as shown in FIGS. 1 and 11 and this taper helps to facilitate mounting of the base on the panel 24 in a staking operation.

In accordance with the invention, the resilient fingers 42 are integrally joined to the body of the tongue 40 at the free lower end thereof and the fingers extend angularly upwardly and outwardly from the lower end of the tongue toward the underside of the panel 24 and/or flange undersurface 36a at a relatively small or shallow angle B as shown in FIG. 10 until such time as the base is installed onto the panel 24.

Each finger 42 includes a lower, outside cam surface 42a extending upwardly from a lower end to an intermediate level 42b to angularly intersect a second upper cam surface 42c extending angularly upwardly and inwardly toward the tongue and terminating at the lower end of an upwardly projecting tab portion or rib 42d at the free upper end of the finger. Each finger also includes an inside surface 42e directly facing an opposing surface of the tongue body and extending downwardly to join the tongue at a level 42f spaced above the lower end.

In accordance with an important feature of the present invention, the base 22 is formed of strong, somewhat resilient, resinous molded plastic material such as an ST801HS "Nylon" resin filled with 7% glass fibers. This material is capable of withstanding operating environmental temperatures of up to 400° F. without becoming too soft and flowable to any great extent under design stress or pressure.

The head and tongue of the base are molded with an integrally formed, thread locking bore 44 in coaxial alignment with the axis D of the embedded metal nut 30 and extending downwardly to the lower end of the tongue 40. The bore 44 is initially formed with a smooth surface cylindrical shape having a diameter that is dimensioned to be less than the major thread diameter of the support post 28, but somewhat greater than the minor thread diameter thereof. For example, the support post 28 may have a lower threaded segment with size M6×1.0 threads and a major thread diameter of 5.97 mm maximum and 5.79 mm minimum. The minor thread diameter of the post is maintained within a tolerance of 4.56 mm minimum and 4.74 mm maximum and the post is formed of 1010-1022 steel with a 0.0005" thick zinc coating for corrosion prevention. The internal threaded bore 30a of the embedded nut 30 is dimensioned with appropriate tolerances to accommodate the threads of the support post 28 and may likewise be treated with a zinc coating to resist corrosion. The smooth surface bore 44 in the "Nylon" base 22 is dimensioned to have a diameter of 5.5 mm minimum to 5.6 mm maximum and accordingly, interference is established between the outer portion of the threads of the support post and the bore 44 to provide a thread locking action as the "Nylon" material of the bore wall is displaced by the threads of the post entering the bore. This lock-nut action between the bore surface and the threads of the post 28 is similar to that of a lock-nut but extends for a much greater length than is customary in a lock-nut.

As the support post 28 is initially threaded into the embedded nut 30 and begins to penetrate the bore 44, the bore surface material is displaced and provides a frictional holding force of approximately 5 to 15 inch-pounds for resisting unwanted turning of the post. This locking force is considerably less than the minimum torque of 40 inch pounds which can be applied to the support post by manual turning of the bumper 32 to select a desired spacing interval S or S' (FIG. 1) between the panels 24 and 34, which interval is thereafter maintained by the frictional engagement between the displaced surface material of the bore 44 acting against the threads of the support post in threaded engagement therewith.

The hood leveler 20 is thus manually adjustable to provide a desired spacing interval S or S' between the panels 24 and 34 and once a selected interval is attained, the interval is maintained by the locking engagement between the surface of the bore 44 in the base 22 and the threads on the support post 28.

In accordance with another important aspect of the present invention, the hood leveler 20 is installed in the rectangular opening 26 on the lower panel 24 in a staking operation by simply moving the tongue 40 and legs 42 downwardly into the opening as indicated by the arrows D' (FIGS. 1 and 10) along the axis D of the assembled hood leveler. The tapered tongue 40 is first centered above the opening 26 and is then moved downwardly (arrow D') as the staking operation proceeds. The lower cam surfaces 42a of the fingers 42 engage opposite edges 26b of the opening and this engagement cams the upper portion of the fingers inwardly toward the tongue body as represented by the position of the fingers designated by the letter A in FIG. 10. As downward insertion proceeds, the fingers 42 bend further inwardly toward the tongue body until the intersect lines 42b of the fingers passes below the kerfs 26a on the underside of the panel 24 on the edges 266 of the opening. When this occurs, the fingers then begin to spring back outwardly toward the position as shown in solid lines in FIG. 10 as the upper cam surfaces 42c move in engagement with the kerfs.

The fingers 42 are dimensioned in length relative to the distance between the head undersurface 36a and lower end of the tongue 40 so that the ribs 42d cannot move outwardly of the kerfs 26a when the spacers 36b and 36c are in contact with the upper surface of the panel 24 upon full insertion of the tongue. The ribs at the upper end of the fingers 42 are self-biased to spring back outwardly of the tongue body 40 and thereby center the tongue laterally (arrow G) in the opening 26 as shown in FIG. 10. In addition, the engagement between the ribs 42c on the upper end of the fingers 42 and the kerfs 26a on the edges of the opening 26, prevents upward withdrawal of the base 22 away from the panel 24, at least until such time as the fingers are intentionally squeezed together inwardly toward the tongue body to the position designated in dotted lines and labelled with the letter A (FIG. 10) so as to clear the opening edges 26b so that the base can be withdrawn upwardly from the panel.

Referring to FIG. 11, during the staking operation, the tapered sides of the tongue 40 aid in initially centering and maintain centered alignment between the tongue and opening. After full insertion as described, there is only a small amount of clearance C provided between the tongue and the adjacent opposite edges 26c of the rectangular opening 26.

Referring again to FIG. 10, during the staking operation, engagement between the cam surfaces 42a and 42c of the fingers 42 maintains a continuous centered alignment between the tongue and the opposite edges 26b of the rectangular opening. This centered alignment is continuously maintained until full insertion of the tongue is completed and the ribs 42d at the upper ends of the fingers 42, tending to spring back outwardly do engage the opposite edges 26b of the rectangular panel opening 26.

In addition, the flanged head 36 of the base 22 is provided with a pair of generally rectangular shaped, spacer bosses 36d, which bosses depend downwardly from the undersurface 36a into the opening 26. Opposite edges of these bosses form stop surfaces 37 spaced inwardly of adjacent panel opening edges 26b to provide a small clearance F on each side of the tongue for limiting lateral travel of the tongue (arrow G) in the opening 26 as a back-up for the centering action of the fingers 42.

Each boss 36d also includes a pair of stop surfaces 39 on each end spaced inwardly of adjacent panel opening edges 26c to establish a small clearance H and provide a back-up limit stop against excessive movement of the tongue 40 in the lateral direction in the opening 26 as indicated by the arrow I (FIG. 11).

While the invention has been described with reference to details of the illustrated embodiment, it should be understood that such details are not intended to limit the scope of the present invention as defined in the appended claims.

What is claimed and desired to be secured by Letters Patent of the United States is:

1. A leveling device for adjustably selecting and thereafter maintaining a selected spacing interval between a pair of members, comprising:
   a base of molded resinous plastic material adapted to be staked into an opening provided in a first of said members and including a body having a mounting flange adjacent a first surface of said first member adjacent at least one edge of said opening, said base including a tongue extending through said opening beyond ann opposite surface of said first member and at lest one deflectable finger integrally connected to said tongue having a free end deflectable toward said tongue to pass through said opening therein and deflectable away from said tongue to engage said second surface at an edge of said opening at an angle for preventing withdrawal of said tongue from said opening and biasing said tongue toward an opposite edge of said opening;
   a female metal threaded element molded in place in said base having a threaded bore in coaxial alignment with a pair of bore segments in said tongue and said flange;
   an elongated threaded support post of metal mounted in said bore segments in adjustable threaded engagement within said bore of said threaded element and extending outwardly of said base;
   a bumper of resilient material secured adjacent an outer end of said support post spaced away from said base and including a bearing surface for supportive engagement with a second of said members; and
   integrally formed lock means in at least one of said bore segments of said base frictionally engaging said threaded support post for preventing unwanted rotation thereof relative to said threaded element for maintaining said selected spacing interval between said pair of members.

2. The leveling device of claim 1, wherein:
   said opening in said first member has at least one pair of said edges which are spaced apart by a dimension greater than the width of said tongue extended therebetween; and
   wherein said body includes a pair of said deflectable fingers integrally formed on opposite sides of said tongue and deflectable outwardly for engaging both said edges of said opening to center said tongue therebetween and prevent withdrawal of said tongue from said opening.

3. The leveling device of claim 1, wherein:
   said tongue includes a free end spaced outwardly from said mounting flange and said deflectable finger is integrally joined to said tongue adjacent said free end thereof and projects angularly outwardly thereof toward said mounting flange.

4. The leveling device of claim 3 wherein:
   said fingers include opposite outer surfaces which are deflectable inwardly toward said tongue by engagement with said opposite edges of said opening upon staking insertion of said tongue into said opening, and which surfaces move clear of said engagement upon nearly reaching full insertion of said tongue permitting said free ends of said fingers to spring outwardly to engage said opposite edges for holding said tongue in centered position in said opening.

5. The leveling device of claim 4, wherein:
   said fingers are formed with opposite second outer surfaces angularly intersecting said first mentioned outer surfaces and extending inwardly therefrom toward said tongue adjacent said free ends for permitting said free ends to spring outwardly into engagement with said opposite edges of said opening.

6. The leveling device of claim 5, wherein:
   said free ends of said fingers have ribs extending outwardly of said second outer surfaces for holding engagement with said opposite edges of said opening at said opposite surface of said first member.

7. The leveling device of claim 2, wherein:
   said body includes projection means adjacent said mounting flange and an inner end of said tongue dimensioned to extend into said opening of said first member when said tongue is fully inserted for limiting lateral movement of said tongue toward and away from said opposite edges of said opening.

8. The leveling device of claim 2, wherein:

said mounting flange extends laterally outwardly of an inner end portion of said tongue and includes a flange surface confronting said first surface of said first member around the periphery of said opening therein.

9. The leveling device of claim 8, including: spacer means on said base engageable with said first surface of said first member which said tongue is fully inserted into said opening for separating said flange surface and said first surface.

10. The leveling of claim 7, wherein:

said projection stop means includes opposing surface facing a second pair of opposite edges of said opening for limiting movement of said tongue therein in a direction laterally transverse to said first direction of lateral movement.

* * * * *

UNITED STATES PATENT AND TRADEMARK OFFICE
CERTIFICATE OF CORRECTION

PATENT NO. : 5,092,550

DATED : March 3, 1992

INVENTOR(S) : JOHN E. BETTINI

It is certified that error appears in the above-identified patent and that said Letters Patent is hereby corrected as shown below:

Col. 7, line 62, "ann" should be -- an --.

Col. 7, line 63, "lest" should be -- least --.

Col. 10, line 2, "which" should be -- when --.

Col. 10, line 5, after "leveling" insert -- device --.

Col. 10, line 6, delete "stop".

Col. 10, line 6, after "opposing" insert -- stop --.

Signed and Sealed this

Fourth Day of May, 1993

Attest:

MICHAEL K. KIRK

*Attesting Officer*        *Acting Commissioner of Patents and Trademarks*